No. 607,921. Patented July 26, 1898.
G. K. ELPHINSTONE & A. C. HEAP.
ELECTRICAL MEASURING INSTRUMENT.
(Application filed May 13, 1898.)
(No Model.)
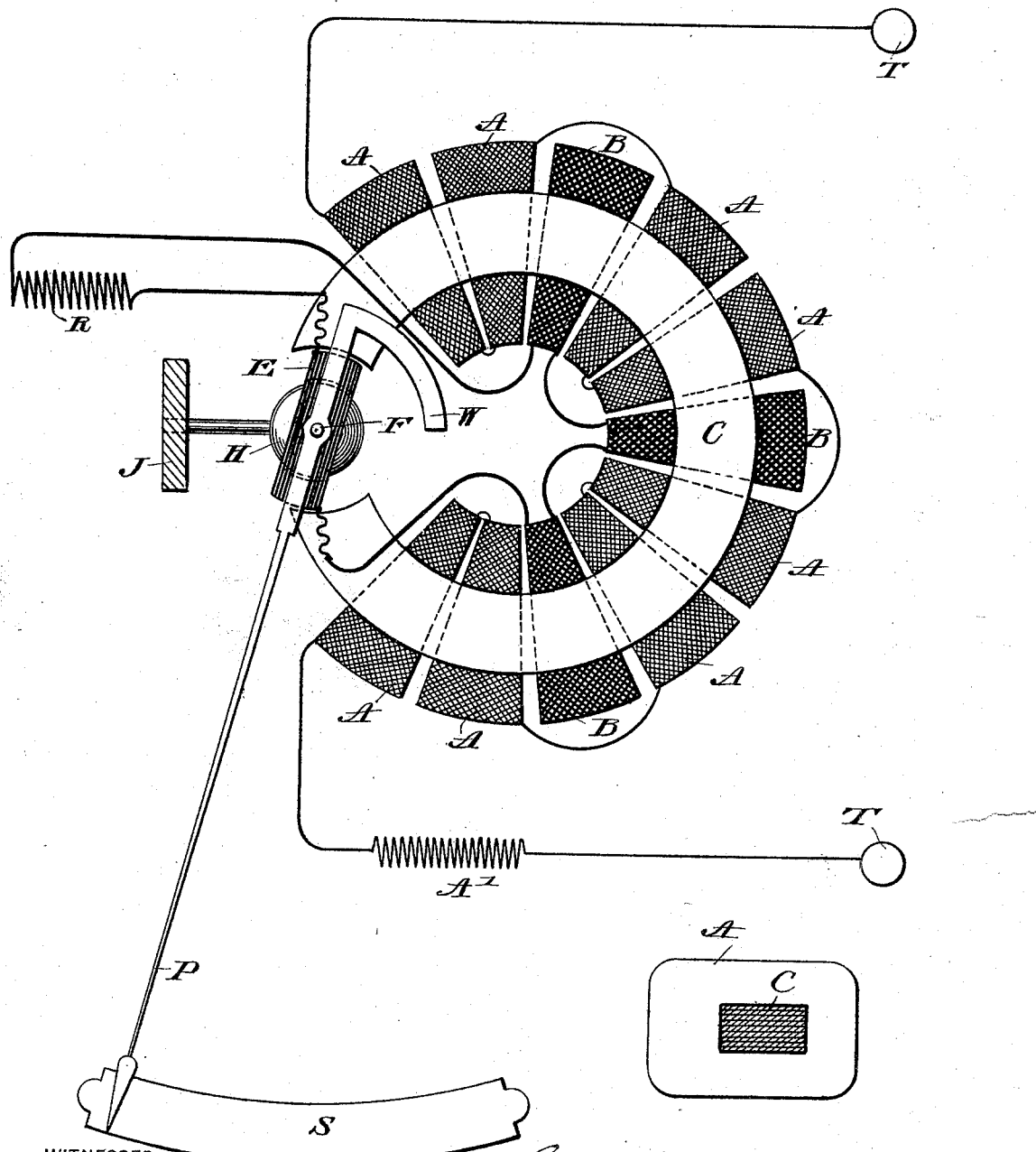
WITNESSES:
INVENTORS:
BY
ATTORNEYS

UNITED STATES PATENT OFFICE.

GEORGE KEITH ELPHINSTONE, OF LONDON, AND ARTHUR CECIL HEAP, OF PENN, ENGLAND.

ELECTRICAL MEASURING INSTRUMENT.

SPECIFICATION forming part of Letters Patent No. 607,921, dated July 26, 1898.

Application filed May 13, 1898. Serial No. 680,566. (No model.)

*To all whom it may concern:*

Be it known that we, GEORGE KEITH ELPHINSTONE, residing at 101 St. Martin's Lane, London, and ARTHUR CECIL HEAP, residing at The Firs, Tyler's Green, Penn, in the county of Buckingham, England, subjects of the Queen of Great Britain, have invented certain new and useful Improvements in Electrical Measuring Instruments, of which the following is a specification.

This invention has for its object the making of an instrument for use on alternating-current circuits for measurements of current strengths which shall be practically independent of periodicity at which the current is supplied and of variations of the shape of the curve of such currents. An electromagnet is used, the iron core being constructed of laminated plates, and the poles are so shaped as to allow of a pivoted or suspended coil moving in the annular space between these poles. A fixed soft-iron core-piece may be placed centrally with the moving coil. The amount of rotation or movement of the coil can be controlled by gravity or springs, and it may carry an index-pointer or like attachment serving to indicate or record the angular displacement of the coil. By regulating the windings of the electromagnet, which windings are preferably made up in sections, the magnetic flux in the iron may be controlled. The windings of wire upon this electro-magnet are arranged in two or more distinct sections, according to the object for which the instrument is intended. When the instrument is intended for use as a voltmeter, then we wind two complete windings upon the electromagnet-core, one of which is connected to the source of alternating current to be measured, a suitable non-inductive resistance being connected in series with these coils according to the range or value of the electromotive force to be dealt with. The other winding has its extremities connected to the moving coil which carries the pointer, which coil is free to turn against the action of a spring or gravity in the field of the electromagnet such secondary winding on the electromagnet and the moving coil between the poles forming a secondary circuit, the currents flowing in which are induced by the change of the magnetism produced in the electromagnet by the first-mentioned windings. We may arrange that the number of turns of wire in the two sections on the electromagnet may be equal, so as to produce the same electromotive force across the extremities of the secondary winding as exists between the extremities of the primary winding, or we may make the secondary winding on the electromagnet of a smaller number of turns or, when required, of a much higher number of turns, so that the electromotive force induced in the secondary coil on the electromagnet may be considerably higher than the electromotive force applied to the primary. We can interpose a resistance in the connection between the secondary circuit on the electromagnet and the coil which is free to move in the field.

The accompanying drawing shows diagrammatically so much of an instrument as is required to illustrate our invention.

The laminated core of the electromagnet is shown at C. Upon this are mounted eight coils A A, which are all connected up in series, and the extremities of the outside coils are carried to the binding-post T T. These coils are distributed upon the core in pairs at four equidistant points, and a non-inductive resistance A' may be connected into their circuit. Uniformly distributed between these coils are three coils B B B, which are connected up together. The wire from one end of the coils B is carried to the resistance R, and the other end is joined to the moving coil E, pivotally mounted to turn in the gap between the poles of the core C. The other terminal of the moving coil is joined to the resistance R. The coils B B B, therefore, with the resistance R and the moving coil E, form a complete circuit, which is entirely distinct from any of the other windings in the instrument. Other methods may be adopted for distributing the windings on the core C. The object to be kept in view is that the two sets of windings shall be as uniformly distributed as possible to avoid magnetic leakage. The moving coil E is carried upon two pivots F, and a pointer P is connected to the moving coil, so that its movements can be observed upon the scale S. The turning action of the current through the coil E is opposed by means of a weight W, or any other suitable arrangement may be adopted for this purpose. Mounted centrally within the coil E, but entirely free from it and supported from the frame of the instrument J, is a core H, which may be laminated, and the object of which is to keep the magnetic circuit of as low resistance as possible. In an organization of this kind magnetic leakage is substantially eliminated, the energy of movement of the pivoted coil is considerable, and angular movement thereof indicates the current strength irrespective of its periodicity.

Obviously the instrument may be wound to act either as a voltmeter or ammeter.

The value of the resistance R may be adjusted to adapt the instrument to any value of current strength, while the resistance A' may be used where it is not desirable that the primary windings should carry the full current of the circuit in which they are connected.

We claim as our invention—

1. The combination of the electromagnet-core, the primary windings disposed thereon, the secondary winding, a pivoted or swinging coil mounted between the poles of the core, and included in closed circuit with said secondary winding, and an indicating device operated by the swinging coil.

2. The combination of the electromagnet-core, a series of connected windings disposed at substantially equal intervals thereon, a secondary series of windings disposed upon the core between the windings of the first series, a pivoted or swinging coil mounted between the poles of the magnet and included in closed circuit with said secondary windings, and an indicating device operated by the swinging coil.

In testimony whereof we have hereunto subscribed our names.

GEORGE KEITH ELPHINSTONE.
ARTHUR CECIL HEAP.

Witnesses to the signature of George Keith Elphinstone:
C. D. LADLEY,
EDWARD C. DAVIDSON.

Witnesses to the signature of Arthur Cecil Heap:
HARRY F. B. FAST,
WILLIAM PHILLIPS.